United States Patent Office 3,840,625
Patented Oct. 8, 1974

3,840,625
PROCESS FOR THE PREPARATION OF SYNTHETIC PAPER
Sadao Yamamoto, Kyoto, Seiichirou Honda, Osaka, Hisataka Shimizu, Kyoto, and Kanzi Oguma, Osaka, Japan, assignors to Sekisui Kagaku Kogyo Kabushiki Kaisha, Osaka, Japan
No Drawing. Continuation-in-part of abandoned application Ser. No. 830,855, June 5, 1969. This application Feb. 29, 1972, Ser. No. 230,477
Int. Cl. B29d 7/04
U.S. Cl. 264—41       9 Claims

ABSTRACT OF THE DISCLOSURE

Synthetic paper exhibiting excellent graphic properties and printability similarly to pulp paper, consisting essentially of a homogeneous composition comprising 5–50 parts by weight of ethylene synthetic resin component per 100 parts by weight of a styrene synthetic resin component, and 1–200 parts of inorganic filler, the parts being by weight, is prepared by a process which comprises homogeneously melting and milling such composition; shaping the milled composition into a film; contacting at least one surface of the film with a first liquid system capable of dissolving the styrene synthetic resin component comprising at least one liquid, dialkylamide or dialkylsulfoxide; and thereafter contacting the same surface with a second liquid system compatible with the first liquid system, but incapable of dissolving the styrene resin component, i.e., water, whereby the styrene synthetic resin component which has been dissolved is precipitated and coagulated in the form of finely divided particles producing a finely porous structure on the surface of the film.

---

This application is a continuation-in-part of application Ser. No. 830,855, filed June 5, 1969, now abandoned.

This invention relates to a process for producing synthetic paper consisting predominantly of styrene resins; more particularly, the present invention is directed to a process for producing synthetic papers utilizing a specific composition and treatment techniques.

Various types of synthetic paper composed chiefly of thermoplastic resins are available. For example, various procedures for treating films of polyvinyl chloride, polystyrene, polyethylene, polyester, cellulose acetate resin, and the like to impart printability and graphic properties thereto, are known.

Conventional processing methods for forming such synthetic resin films into synthetic paper include that of making the film surface aventurine with emboss rolls, sand blasting, etc.; that of fixing finely divided inorganic substances on the film surface by applying onto the film surface a resin in liquid form in which the inorganic substance is dispersed; that of making the film surface white or cellular, by applying and infiltrating a solution, which is capable of chemically dissolving or swelling the film surface, to the film surface and then removing the solution by solvent (solution) substitution, heating, or other suitable means; and that of perforating the film surface with corona discharge, etc.

However, while the synthetic papers obtained through such known methods possess favorable properties, such as water resistance, compared with paper from pulp, their graphic properties and printability are still unsatisfactory. The synthetic papers are also expensive and have limited utility.

It is also known to mold a synthetic resin composition, such as an olefinic resin which contains an inorganic substance dispersed therein, into a film serving as a synthetic paper. However, in such method the moldability of the composition is quite unsatisfactory due to the presence of the inorganic substance. Accordingly, the film formation is very difficult, and furthermore, the resulting synthetic paper is impractical because of poor physical strength, although its printability and graphic properties are somewhat improved over those of the previously described synthetic papers. Also the last synthetic paper exhibits properties disadvantageous for paper quality, such as elongation.

Strenuous studies have been conducted aiming at the preparation of satisfactory synthetic paper, and as the result, it has now been discovered that when a film is produced by homogeneously melting and milling a mixture of a styrene synthetic resin component and an ethylene synthetic resin component, the mixture predominating in the styrene synthetic resin component, and in addition, an inorganic filler and when such film is treated by contacting at least one surface with a first liquid system capable of dissolving the styrene synthetic resin component, i.e. a liquid system comprising at least one, dialkylamide or dialkylsulfoxide and thereafter the same surface is contacted with a second liquid system incapable of dissolving the styrene synthetic resin component, compatible with the first liquid system, i.e. water, a synthetic paper is produced having excellent graphic and printability properties while eliminating all of the disadvantages and defects of prior art processes and products.

Accordingly, it is a principal object of the present invention to provide a process for the preparation of synthetic paper having excellent graphic and printability properties wherein such paper is produced from a film consisting essentially of a predominate amount of a styrene synthetic resin component, an ethylene synthetic resin component and an inorganic filler and at least one surface of such film is first contacted with a first liquid system capable of dissolving the styrene synthetic resin component, i.e. a liquid system comprising a dialkylamide or dialkylsulfoxide and thereafter the same surface is contacted with a second liquid system compatible with the first, but incapable of dissolving the styrene synthetic resin component, i.e. water, for a period of time and under such conditions whereby the styrene synthetic resin component which has been dissolved precipitates and coagulates as finely divided particles on the treated surface of the film.

A further object of the present invention resides in a method for the preparation of synthetic paper exhibiting excellent graphic properties and printability similar to pulp paper, which is made of thermoplastic synthetic resin film, i.e., one on which pencil, fountain pen, and similar writing tools can be used to write and can be printed with ordinary printing ink.

Another object of the present invention resides in a method for the preparation of synthetic paper made of thermoplastic synthetic resin, which exhibits improved resistances to water, moisture, and chemicals over those of pulp paper, and furthermore, has a hand resembling that of pulp paper.

Still another object of the present invention resides in a method for the preparation of synthetic paper which can be cut and folded in a manner similar to pulp paper, and possesses substantially equal wrapping or packing ability to that of pulp paper.

Still other objects and advantages of the present invention will become apparent from the following description.

The foregoing objects are accomplished, by the process comprising homogeneously melting and milling a composition consisting essentially of a styrene synthetic resin component and per 100 parts of the styrene synthetic resin component, 5–50 parts of an ethylene synthetic resin component, and 1–200 parts of inorganic filler, the parts being by weight; shaping the composition into film; contacting at least one surface of the film with a first liquid system capable of dissolving the styrene synthetic resin component comprising at least one liquid or dialkylsulfoxide and thereafter contacting the same surface with a second liquid system compatible with the first liquid system but incapable of dissolving the styrene resin component, i.e. water, whereby the styrene synthetic resin component which has been dissolved is precipitated and coagulated in the form of finely divided particles producing a finely porous structure on the surface of the film.

The expression "styrene synthetic resin component" referred to in this specification is meant to include a styrene homopolymer, high impact polystyrene (for instance, a blend of polystyrene with a synthetic rubber such as polybutadiene, styrene-butadiene copolymer and acrylonitrilebutadiene copolymer, and a graft copolymer of polystyrene with such synthetic rubbers), acrylonitrile-styrene copolymer, acrylonitrile - butadiene - styrene copolymer, methyl methacrylatestyrene copolymer, α-methylstyrene homopolymer and α-methylstyrene copolymers, etc.

The expression "ethylene synthetic resin component" is meant to include high density polyethylene, medium density polyethylene, low density polyethylene, low polymerized polyethylene, chlorinated polyethylene, ethylene-propylene copolymer, ethylene-vinyl acetate copolymer, ethylene-vinyl chloride copolymer, ethylene-ethyl acrylate copolymer, ethylene-acrylic acid ionomer, etc. The copolymers of ethylene with other monomers are particularly preferred because of their good miscibility with inorganic fillers. It is also permissible to use an ethylene synthetic resin which has been vulcanized or crosslinked to such an extent that the flowability of the resin during the film molding of the composition is not injured.

One or more of such styrene synthetic resins as well as ethylene synthetic resins can be used. Also the quantitative ratio of the styrene synthetic resin to ethylene synthetic resin is variable depending on the intended utility of the product paper, within the range of 5–50 parts by weight of the latter per 100 parts of weight of the former.

When a styrene copolymer or copolymers are used as the styrene synthetic resin component, the styrene content of the copolymer or copolymers is suitably variable according to the type of copolymer and combination thereof with ethylene synthetic resin that is used. Normally preferred copolymers are those containing at least 20 wt. percent, particularly 50 wt. percent of styrene. Also the ethylene content of the ethylene copolymers is suitably variable depending on the type of copolymer and combination thereof with the styrene synethic resin component. Copolymers of considerably less ethylene content can be used, and the preferred ethylene content is at least 3 wt. percent, particularly approximately 5 wt. percent and above, inter alia, not less than 30 wt. percent.

Preferred inorganic fillers include calcium carbonate, silica, aluminium silicate, calcium silicate, magnesium silicate, talc mica powder, magnesium carbonate, sodium silicate, clay, diatomaceous earth, calcium sulfate, titanium oxide, zinc sulfide, magnesium sulfide, barium sulfate, and basic lead carbonate. The preferred grain size of such fillers ranges from 0.015 to 5 microns in diameter. Among the above-named fillers, titanium oxide, zinc sulfide, magnesium sulfide, barium carbonate, and basic lead carbonate serve also as a white pigment, and therefore are effective to improve the whiteness of the paper product. The amount of the inorganic filler differs depending on the intended utility of the paper and type of the filler, and is selected from the range of 1–200 parts per 100 parts of styrene synthetic resin component, the parts being by weight. A particularly preferred amount of filler ranges from 20 to 80 parts per 100 parts of the styrene synthetic resin component, preferably, the total amount of ethylene synthetic resin component and inorganic filler per 100 parts by weight of the styrene synthetic resin component is at least 25 parts by weight.

When the ethylene synthetic resin component is added to the styrene synthetic resin component, melted and milled, extruded into film, and treated as hereinafter described, a nontransparent or opaque film is obtained. The film has excellent graphic properties and printability. Furthermore, the addition of the ethylene synthetic resin component can effectively suppress the feel of the styrene synthetic resin film which tends to be similar to that of a metallic foil, without extreme reduction in the latter's excellent rigidity. Accordingly, the paper is imparted with such favorable properties as bending, strength, toughness, suppleness, impact strength, tear strength and resistance to crumbling, with reduced elongation. With further addition of one or more inorganic fillers to the composition, printability and graphic properties of the product paper are markedly improved, and furthermore, hardness, rigidity, dimensional stability, etc., are improved while the cost is reduced.

According to the present invention, it is often advantageous to add a rubber such as polybutadiene, styrene-butadiene rubber, acrylonitrile-butadiene rubber, and the like, or a resin such as polyvinyl acetate, to the above composition of the styrene synthetic resin component, ethylene synthetic resin component, and inorganic filler. Such addition is effective for improving physical properties of the film, such as impact strength. The amount of such rubber or resin to be added is not critical, but normally it is preferred to use not more than 400 parts of such additional component per 100 parts of the styrene synthetic resin component in the composition, the parts being by weight. An amount ranging from 40–100 parts is used in most cases, but a lesser amount, for example, 20 parts or even less per 100 parts of the styrene resin component, can be employed.

Furthermore, an optical additive or additives such as, fibers, stabilizers, surface active agents, antistatic agents, plasticizers, lubricants, ultraviolet ray absorbents, antioxidants, etc. may be added to the above composition.

The composition is homogeneously melted and milled, and shaped into film in conventional manner, by such means as inflation-die, calender roll, T-die, etc. The film can be imparted with excellent luster, smoothness, hardness, rigidity, tensile strength and cutting property, if it is biaxially stretched during the film formation. If the biaxial stretching is omitted, the film exhibits good whiteness, elongation and softness. The properties of drawn film also obviously vary in connection with the draw ratio as expressed by orientation ratio, etc. Furthermore, the properties of the film are also controllable by the shaping temperature. For example, shaping at a temperature lower than the conventional film-forming temperature produces a film of excellent whiteness. Thus, such factors as draw ratio and shaping temperature are suitably selected according to the type of synthetic paper desired, while it is normally preferred to stretch the film by at least 1.5 times each, in both longitudinal and horizontal directions.

The film which is shaped from a homogeneously molten and milled composition consisting essentially of a styrene synthetic resin component and per 100 parts by weight of the styrene synthetic resin component, 5–50 parts by weight of ethylene synthetic resin component, and 1–200 parts by weight of inorganic filler, is surface-contacted with a first liquid system capable of dissolving the styrene synthetic resin component, and then with a second liquid system which is compatible with the first liquid system but incapable of dissolving the styrene synthetic desin component.

It is a very important requirement that the first and second liquid systems should be compatible and miscible. That is, when the two are not sufficiently miscible, the penetration of first liquid system into the inside of the film after dissolving the film surface cannot be stopped. Furthermore, since the first liquid system cannot be quickly replaced by the second liquid system, a cellular or porous layer cannot be formed as the surface layer, and consequently, the printability and graphic properties of the paper are not improved. Therefore, the first and second liquid systems must exhibit mutual compatibility and miscibility, in accordance with the present invention.

In accordance with the process of the present invention, the first liquid system capable of dissolving the styrene synthetic resin component comprises at least one liquid selected from dialkylamides and dialkylsulfoxides.

The dialkylamides advantageously utilized in accordance with the present invention, are those compounds represented by the formula:

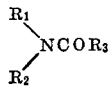

wherein $R_1$ and $R_2$ are alkyl groups, preferably a lower alkyl group of 1–4 carbon atoms, and $R_3$ is a hydrogen atom or alkyl group, preferably a lower alkyl group of 1–4 carbon atoms.

Exemplary substituted dialkylamides include, for example, dimethyl formamide, diethyl formamide, dimethyl acetamide, diethyl acetamide, etc.

The sulfoxides applicably used in accordance with the present invention are compounds of the formula.

wherein $R_1$ and $R_2$ are alkyl groups, preferably a lower alkyl group of 1–4 carbon atoms.

Exemplary dialkyl sulfoxides include dimethyl sulfoxide, diethyl sulfoxide, etc.

More specifically, in accordance with the process of the present invention, the first liquid system is one which contains at least 10% by volume of dialkylamide or dialkylsulfoxide, preferably 10–80% by volume, the remainder being a conventional solvent or carrier. Such conventional solvent or carrier includes, for example, ketones such as methyl ethyl ketone, acetone, etc., ethyl acetate and the like.

In accordance with the process of the present invention, the second liquid system (which is compatible with the first liquid system) is one which contains at least 50% by volume water, preferably at least 60% by volume. Here again, the remainder can be any compatible conventional carrier or solvent material. The conventional solvents or carriers are any of those enumerated above plus, for example, lower alkanols, such as methanol.

In accordance with the present invention, the first liquid system is generally maintained at a temperature of from 5–35° C. while the second liquid system is generally maintained at a temperature of from 5–50° C.

Furthermore, it is often advantageous in accordance with the present invention to include dissolved within the first liquid system, up to 20% by weight of one or more synthetic resins. The styrene synthetic resin component can be contained within the first liquid system.

The dialkylamides and dialkylsulfoxides in the first liquid system are excellent solvents for the styrene synthetic resins, and have high affinity for water contained in the second liquid system as well as for various other solvents. Since the dialkylamide and the dialkylsulfoxide all have excellent affinity for water, they and the water are dissolved in each other within a very short period of time as a result of contacting a solvent containing the dialkylamide dialkylsulfoxide adhered to the surface of the film with a solvent which consists predominantly of water. Consequently, the dissolving ability of the first liquid adhered to the surface of the film is abruptly reduced, and the styrene resin which has been somewhat dissolved by the above-mentioned solvent becomes finely divided particles, which are precipitated and coagulated to form a finely porous structure on the surface of the film.

Since the treatments with the first liquid system and the second liquid system are performed smoothly in a short period of time, the solvent does not remain on the surface of the film, and does not diffuse and penetrate into the inside of the film more than necessary. This obviates an abnormal softening of the film or the occurrence of a wavy configuration of the film. As a result of the uniform precipitation and coagulation of the styrene resin dissolved on the surface of the film, a uniform and fine rough surface is obtained, which has good printability and graphic properties. These properties are especially outstanding when the first liquid system and the second liquid system are within the preferred range. Furthermore, as water can be used as the non-solvent, the process of the invention is suitable for industrial application from the standpoint of economy, and the treatment of waste water can be easily carried out.

If the amount of the dialkylamide, and/or dialkylsulfoxide is less than 10% by volume, the dissolving ability of the styrene synthetic resin film is reduced, and the first liquid system has a lessened affinity for water. Accordingly, the surface-roughening of the film becomes time-consuming, and it is difficult to obtain a roughened surface having good printability and graphic properties.

The surface-roughening of the film in accordance with the present invention can be achieved by performing the contacting of the first liquid system with the film surface for a period of 0.1 to 1.5 seconds. If the treating time is longer than 1.5 seconds, the resulting dissolved layer becomes so thick as to cause a reduction in the surface strength. Therefore, when the resulting synthetic paper is fed into a printing machine, the porous layer on the surface is stripped off by the stickiness of the printing ink. Furthermore, such longer treating times do not give a fine and compact porous layer, and because of a reduced density of the porous layer, the blotting of printing ink tends to occur during the printing of the resulting synthetic paper.

If the treating time is shorter than 0.1 second, the dissolved layer becomes too thin to fully form a porous structure, and the resulting synthetic paper lacks ink receptivity and has poor printability.

The preferred temperature of the first liquid system and of the second liquid system is 10 to 25° C. This temperature is low and does not cause heat-deformation of the film. This ensures a complete freedom of the film having a porous structure formed on its surface from the warping or deformation which is most undesirable for printing. Furthermore, since the temperatures of 10–25° C. are substantially room temperature, it is not particularly necessary to heat or cool the first and second liquid systems.

The thickness of the porous layer is generally 0.5–20 microns, preferably 2 to 10 microns. If the thickness of the porous layer is larger than 20 microns, the surface strength of the porous layer becomes small, and the porous layer tends to be stripped off by the stickiness of the printing ink during printing, and the surface lacks abrasion resistance. If the thickness of the porous layer is smaller than 0.5 micron, the non-transparency of the surface by surface roughening is reduced, and the receptivity of the printing ink becomes poor. When the thickness of the porous layer is 2 to 10 microns, the resulting synthetic paper has good printability, abrasion resistance, surface strength, and non-transparency.

It is also a permissible practice to disperse an inorganic filler such as calcium carbonate, clay, titanium oxide, talc, etc. in the first liquid system, and to fix the inorganic filler on the film surface when the film is contacted with the liquid system.

Furthermore, an addition or additives such as surface active agents, antistatic agents, stabilizers, dyestuffs, pigments, etc., may be suitably added to the first or second liquid system to improve the corresponding properties of the resulting synthetic paper as required.

Since the film serving as the basic material or substrate of the synthetic paper of this invention is essentially composed of styrene synthetic resin component, ethylene synthetic resin component and inorganic filler, the paper exhibits very favorable properties quite close to those of pulp paper. With the additional contacting treatments of the film surface with a liquid system which can dissolve the styrene synthetic resin component and then with another liquid system which is compatible with the first liquid system but cannot dissolve the styrene synthetic resin component, the film surface is converted to a cellular or porous layer, which imparts excellent printability and graphic properties to the product paper, as supported by the excellent characteristics of the product attributable to the above film composition. Furthermore, the synthetic paper obtained in accordance with the invention is easy of manufacture and not expensive, and exhibits excellent properties not expected with pulp paper, such as waterproofness, moisture resistance, chemical resistance, flame resistance and weatherability.

Accordingly, the synthetic paper of this invention has a wide range of application, such as news print, art paper, high quality printing paper, normal writing paper, tracing paper, photographic paper, tissue paper, cardboard, sliding-door paper, wrapping paper, etc., and generally as a substitute for pulp paper.

Hereinafter the invention will be explained with reference to the working Examples, in which parts are by weight unless specified otherwise. The "orientation ratio" referred to in the Examples are measured as follows: 100-mm. long lines crossing each other at the center are written on the surface of drawn film, and the film is immersed in liquid glycerine or liquid paraffin and heated to approximately 150° C. until no further shrinkage takes place. Thereafter, the length of the two lines on the film are measured. The orientation ratio is given by the formula $$\frac{100}{a} \times \frac{100}{b}$$

where "$a$" denotes the length of the vertical line and "$b$" that of the horizontal line, expressed in mm.

EXAMPLE 1

| | Parts |
|---|---|
| Polystyrene | 100 |
| (Asahi Dow Kabushiki Kaisha, "Styron 666") | |
| Ethylene-vinyl acetate copolymer | 20 |
| (Mitsui Polychemical Kabushiki Kaisha, "Elvax 150") | |
| Styrene-butadiene rubber | 5 |
| (Nippon Gosei Gomu Kabushiki Kaisha, "JSR 1502") | |
| Calcium carbonate | 20 |
| (Nitto Funka Kogyo Kabushiki Kaisha, "Ncc-410") | |
| Silica | 10 |
| (Konoshima Kagaku Kogyo Kabushiki Kaisha, "Starsil T") | |

A mixture of the above composition was thoroughly milled at 150° C., and extruded through a circular die at 170° C. In this way, a 0.1-mm. thick semi-transparent film was obtained.

The film was first immersed in a liquid mixture composed of 50 vol. percent of dimethylformamide and 50 vol. percent of methyl ethyl ketone at a temperature of 5° C. for 1 second, and immediately thereafter immersed in water at a temperature of 5° C. containing 0.05 wt. percent of a surface active agent (Marubishi Yuka Kabushiki Kaisha, "Eponol"—Polyoxyethylene polypropylene glycol ether) for 5 seconds, followed by drying with hot air current of 50–60° C. producing a porous layer of 15 microns in thickness. The resulting synthetic paper exhibited excellent printability and paper processibility and had satisfactory whiteness. The paper was quite useful for ordinary office work.

EXAMPLE 2

| | Parts |
|---|---|
| High impact polystyrene | 100 |
| (Asahi Dow Kabushiki Kaisha, "Styron 475") | |
| Ethylene-vinyl acetate copolymer | 10 |
| (Mitsui Polychemical Kabushiki Kaisha, "Elvax 150") | |
| Talc | 20 |
| (Nippon Talc Kabushiki Kaisha, "LM-R") | |
| Titanium oxide | 7 |
| (Ishihara Sangyo Kabushiki Kaisha, "Tipaque R-680") | |
| Antistatic agent | 1 |
| (Lion Yushi Kabushiki Kaisha, "Leostat"-Ampholytic imidazoline) | |

A mixture of the above composition was milled at 170° C., shaped into a film of 0.3 mm. in thickness with a calender roll, and biaxially stretched with a tentering machine until the thickness was reduced to 0.1 mm. A white and non-transparent film having lustrous surfaces was obtained. Subsequently, the film was immersed in a liquid system composed of 10 vol. percent of dimethylformamide and 90 vol. percent of acetone at 10° C. for 1 second, and immediately thereafter immersed in warm water of 40° C. for approximately 60 seconds, followed by hot air current drying, thereby forming a porous layer 5 microns in thickness. The synthetic paper obtained exhibited excellent printability and processibility, had smooth and lustrous surfaces and excellent whiteness, and was suitable as art paper.

EXAMPLE 3

| | Parts |
|---|---|
| High impact polystyrene | 90 |
| (Asahi Dow Kabushiki Kaisha, "Styron 475") | |
| Acrylonitrile-styrene copolymer | 10 |
| (Asahi Dow Kabushiki Kaisha, "Tyril 767") | |
| Ethylene-vinyl acetate copolymer | 10 |
| (Nippon Polychemical Kabushiki Kaisha, "Ultrathene UE 634") | |
| Talc | 30 |
| (Nippon Talc Kabushiki Kaisha, "LM-R") | |
| Titanium oxide | 5 |
| (Ishihara Sangyo Kabushiki Kaisha, "Tipaque R-680") | |

A mixture of the above composition was milled at 170° C., and inflation molded as extruded from a circular die of 170° C., to form a white, strongly lustrous, hard type film of 0.1 mm. in thickness. The film was immersed in a liquid system composed of 30 vol. percent of dimethylsulfoxide and 70 vol. percent of methyl ethyl ketone at 25° C. for approximately 0.1 seconds, and immediately thereafter in another liquid system composed of 60 vol. percent of water and 40 vol. percent of methanol at 10° C. for 10 seconds, followed by hot air current drying, producing a porous layer, 2 microns in thickness. The resulting synthetic paper exhibited excellent printability and paper processibility, and had lustrous surfaces and resilient hand.

EXAMPLE 4

| | Parts |
|---|---|
| Acrylonitrile-butadiene-styrene resin | 100 |
| (Asahi Dow Kabushiki Kaisha, "Styrack 301") | |
| Ethylene-ethylene acrylate copolymer | 20 |
| (Dow Chemical Co., Ltd. "Zetafin 30") | |
| Polyvinyl acetate | 15 |
| (Sekisui Kagaku Kogyo Kabushiki Kaisha, "S-nyl p-42") | |
| Calcium carbonate | 30 |
| (Nitto Funka Kogyo Kabushiki Kaisha, "Ncc-410") | |
| Zinc sulfide | 10 |
| (Sakai Kagaku Kogyo Kabushiki Kaisha) | |

A mixture of the above compositions was milled at 150° C., and extrusion molded from a T-die with a tip temperature of 175° C. into a tough film of 0.2 mm. in thickness. The film was first immersed in a liquid system composed of 10 vol. percent of dimethylacetamide, 50 vol. percent of acetone, and 40 vol. percent of ethyl acetate at 20° C. for approximately 1.5 second, and immediately thereafter immersed in a solution formed by dissolving 5 parts of methyl cellulose (Shin-etsu Kagaku Kogyo Kabushiki Kaisha 65 SH'') in 100 parts of water at 50° C. for 10 seconds, followed by hot air current drying, producing a porous layer of 20 mcirons in thickness. The resulting synthetic paper was thick and tough, and exhibited excellent printability and paper processability such as bending resistance. The paper also had a high surface hardness, and provided a good substitute for conventional file paper, photograph-mounting paper, etc.

EXAMPLE 5

| | Parts |
|---|---|
| High impact polystyrene | 100 |
| (Asahi Dow Kabushiki Kaisha, "Styron 475") | |
| Ethylene-acrylic acid ionomer | 20 |
| (Mitsui Polychemical Kabushiki Kaisha, "Surlyn A 1602") | |
| Calcium carbonate | 20 |
| (Nitto Kunka Kogyo Kabushiki Kaisha, "Ncc–410") | |
| Silica | 20 |
| (Konoshima Kagaku Kogyo Kabushiki Kaisha, "Starsil T") | |
| Titanium oxide | 5 |
| (Ishihara Sangyo Kabushiki Kaisha, "Tipaque R–680") | |

A mixture of the above composition was milled at 150° C., shaped into a 0.3-mm. thick film with a calender roll, and the film was biaxially stretched with a tentering machine until its thickness was reduced to 0.1 mm. The film was then immersed in dimethylformamide at a temperature of 180° C. for 1.2 seconds, and immediately thereafter immersed in water at 18° C. containing 0.5 wt. percent of an antistatic agent (Nippon Yushi Kabushiki Kaisha, "Anone BF"—Ampholytic type alkylbetaine) for 5 seconds, followed by hot air drying to produce a porous layer 6 microns in thickness. The resulting synthetic paper had a specific gravity less than that of ordinary high quality pulp paper, and excellent mechanical strength, such as high cushioning property and crumbling resistance. The paper also exhibited excellent printability, and could be quite suitably used as clearly printed wrapping paper.

EXAMPLE 6

| | Parts |
|---|---|
| High impact polystyrene | 100 |
| (Aashi Dow Kabushiki Kaisha, "Styron 475") | |
| Ethylene-vinyl acetate copolymer | 15 |
| (Nippon Polychemical Kabushiki Kaisha, "Ultrathene UE 634") | |
| Acrylonitrile-butadiene rubber | 5 |
| (Nippon Zeon Kabushiki Kaisha, "Hycar 1014") | |
| Calcium carbonate | 30 |
| (Nitto Funka Kogyo Kabushiki Kaisha, "Ncc–410") | |
| Titanium oxide | 7 |
| (Ishihara Sangyo Kabushiki Kaisha, "Tipaque R–680") | |

A mixture of the above composition was milled at 150° C., and inflation molded through a circular die of 160° C. to form a film of 0.1 mm. in thickness. Then a solution formed by dissolving polystyrene (Aashi Dow Kabushiki Kaisha, "Styron 666") in a liquid system at 21° C. composed of 40 vol. percent of dimethylformamide, 30 vol. percent of methyl ethyl ketone, and 30 vol. percent of acetone, in an amount corresponding to 10 wt. percent based on the total liquid system, was daubed on the above film surfaces with a reverse roll, the amount counted being 15 g./m.². Two seconds after the daubing, the film was immersed in water at 19° C. for approximately 1.5 seconds, and dried with hot air current, producing a porous layer of 10 microns in thickness. The resulting synthetic paper exhibited excellent printability and paper processibility. Since pencils of high lead hardness wrote very well on the paper, the product had a wide range of application as printing paper, writing paper, etc. When the synthetic paper was super-calender treated, a highly lustrous product was obtained.

EXAMPLE 7

A film obtained from the composition of Example 6 in a manner identical with Example 6 was immersed in a liquid system which could dissolve the styrene synthetic resin component similar to that employed in Example 1, for 1 second, and immediately thereafter immersed in a 1.2 wt. percent aqueous gelatin (product of Nippon Hikaku Kabushiki Kaisha) solution for 5 seconds, followed by hot air current drying. The resulting synthetic paper exhibited markedly greater bonding force with the coating formed when a gelatin solution (e.g., sensitive material for photographic paper) is applied, compared with the similarly treated film except that the second liquid system contained no gelatin. This paper was valuable as the paper material to which a gelatin solution or like aqueous solution is to be applied, such as base papers of photographic and copying papers.

EXAMPLE 8

| | Parts |
|---|---|
| High impact polystyrene | 90 |
| (Asahi Dow Kabushiki Kaisha, "Styron 475") | |
| Acrylonitrile-butadiene-styrene resin | 10 |
| Asahi Dow Kabushiki Kaisha, "Styrack 301") | |
| High density polyethylene | 10 |
| Mitsui Kagaku Kogyo Kabushiki Kaisha, "Hizex 6100P") | |
| Ethylene-vinyl acetate copolymer | 10 |
| (Mitsui Polychemical Kabushiki Kaisha, "Elvax 150") | |
| Clay | 30 |
| (Nippon Talc Kabushiki Kaisha, "Nc–O") | |
| Titanium oxide | 10 |
| (Ishigara Sangyo Kabushiki Kaisha, "Tipaque R–680") | |

A mixture of the above composition was milled with a mixing roll of 175° C. for 20 minutes, and thereafter shaped into a 0.25-mm. thick film with a calender roll. The film was further biaxially stretched with a tentering machine until the thickness was reduced to 0.09 mm. The resulting white and non-transparent film was immersed in a liquid system composed of 10 vol. percent of dimethylacetamide, 50 vol. percent of acetone, and 40 vol. percent of methyl ethyl ketone at 32° C. for approximately 0.5 seconds, and immediately thereafter immersed in warm water at 40° C. for 10 seconds, thereby producing a porous layer 10 microns thick, followed by hot air current drying. The synthetic paper exhibited excellent bending strength and crumbling strength, good paper processibility and graphic properties, and was quite suitable as high quality writing paper as used in notebooks, etc.

EXAMPLE 9

| | Parts |
|---|---|
| High impact polystyrene | 90 |
| (Asahi Dow Kabushiki Kaisha, "Styron 475") | |
| Acrylonitrile-butadiene-styrene resin | 10 |
| (Asahi Dow Kabushiki Kaisha, "Styrack 301") | |
| Chlorinated polyethylene | 10 |
| (Showa Denko Kabushiki Kaisha, "Elathlene 301A") | |
| Calcium carbonate | 30 |
| (Nitto Funka Kogyo Kabushiki Kaisha, "Ncc-410") | |
| Titanium oxide | 10 |
| (Ishihara Sangyo Kabushiki Kaisha, "Tipaque R-680") | |
| Ultraviolet ray absorbent | 0.2 |
| (2-hydroxyphenyl benzotriazole) | |
| Stabilizer | 2 |
| (triabasic lead sulfate) | |
| Antioxidant | 5 |
| (Yoshitomi Seiyaku Kogyo Kabushiki Kaisha, "BHT Swanox"—2,6-Di-t-butyl-p-cresol) | |

A mixture of the above composition was milled with a mixing roll of 175° C. for 30 minutes, cooled, ground, and extruded through a T-die metal mold with the tip temperature of 160° C., into a film of 0.4 mm. in thickness. While the film was still in a softened state, it was biaxially stretched with a tentering machine until the thickness was reduced to 0.15 mm. The resulting white film was immersed in a liquid system composed of 10 vol. percent of dimethylformamide, 5 vol. percent of dimethylsulfoxide, and 85 vol. percent of acetone at 10° C. for 0.3 second, and immediately thereafter immersed in another liquid system composed of 50 parts of water, 50 parts of methanol, and 1 part of an antistatic agent (Nippon Yushi Kabushiki Kaisha, "Anone BF") at 10° C. for 3 seconds, followed by hot air current drying, thereby producing a porous layer 2 microns thick. The resulting synthetic paper was tough and resilient, had excellent smoothness, luster and weatherability, and was suitably used as polychromatically printed poster papers and art paper.

EXAMPLE 10

The synthetic papers obtained in Examples 1–9, a 0.1-mm. thick film from high impact polystyrene (Asahi Dow Kabushiki Kaisha, "Styron 475"), an art paper (Mitsubishi Seishi Kabushiki Kaisha, "Mitsubishi Toku Art Paper), and a news print (Ohji Seishi Kabushiki Kaisha) were measured for their surface smoothness, whiteness and ink drying property. The results are presented in Table I.

TABLE I

| | Smoothness (second) | Whiteness (percent) | Ink drying property (min.) |
|---|---|---|---|
| Example: | | | |
| 1 | 805 | 84.0 | 80 |
| 2 | 930 | 92.2 | 100 |
| 3 | 900 | 89.5 | 90 |
| 4 | 880 | 90.0 | 80 |
| 5 | 1,110 | 90.2 | 60 |
| 6 | 1,001 | 91.2 | 80 |
| 7 | 1,300 | 89.0 | 150 |
| 8 | 982 | 90.2 | 80 |
| 9 | 1,190 | 88.8 | 110 |
| High impact polystyrene film | 110 | 10.5 | >1,000 |
| Art paper | 967 | 83.1 | 200 |
| Newsprint | 53 | | 50 |

The smoothness, whiteness, and ink drying property were measured as follows:

Smoothness:

In accordance with JIS P8111, Beck's smoothness and air-permeability tester (product of Toyo Seiki Seisakusho Kabushiki Kaisha) was used, and the mean value of measuring five samples was adopted.

Whitness:

A color computer was used to record the reflection curve, from which the three elements based on C.I.E. were calculated and the whiteness was determined.

Ink drying property:

An RI tester-total surface roller was charged with 0.4 cc. of ink (product of Dai-Nippon Ink Kagaku Kogyo Kabushiki Kaisha, HIZ-G red), followed by 3 minutes' milling. Then the ink was transferred onto each sample paper. Then a sheet of over-lay paper was superposed on an ink drying tester (Yasuka Seiki Seisakusho Kabushiki Kaisha), and the tester was rotated under a load of 100 g. At 10 minute intervals, the state of ink pick-up was examined to determine the ink drying property.

EXAMPLES 11–12 AND CONTROL 1

Example 11

A composition of the following recipe:

| | Parts by weight |
|---|---|
| High impact polystyrene | 100 |
| Ethylene-vinyl acetate copolymer | 10 |
| $TiO_2$ | 10 |
| Clay | 10 | was mixed and kneaded by a mixing roll maintained at 175° C., and then extruded in the form of a film of a thickness of 0.4 mm. from a T-die mold in which the mold tip temperature was maintained at 160° C. While the film was still in the softened state, it was biaxially stretched to obtain a white film of a thickness of 0.15 mm. This film was dipped for 1 second in a mixed liquor composed of 30% by volume of dimethyl formamide, 50% by volume of acetone and 20% by volume of ethyl acetate, and then dipped for 5 seconds in water. The film was dried by hot air. An excellent synthetic paper was obtained.

Example 12

In the same maner as described in Example 11, a biaxially stretched film was prepared. A resin solution formed by dissolving 5 parts by weight of polystyrene in 100 parts by weight of the same mixed liquor as used in Example 11 was coated on the film and immediately the coated film was dipped in water for 5 seconds, followed by hot air drying. An excellent synthetic paper was obtained.

Control 1

In the same manner as described in Example 11, a biaxially stretched film was prepared but no post treatment was conducted. The film was designated as a control.

The surface of each of the films was examined with an electron microscope. The synthetic paper prepared in accordance with the present invention in Example 11 had a surface with a great number of very fine concavities and convexities with a great number of fine pores extending to the interior. The synthetic paper was white with excellent opaqueness. The synthetic paper prepared in accordance with Example 12 had a surface which was rich in smoothness with a great number of fine pores, such paper also being white with excellent opaqueness. The paper prepared in accordance with the control was free of the above noted characteristics with only rough concavities and convexities being formed.

Ink Receptivity Test

A commercially available red oil ink was printed on the synthetic paper prepared in Example 11 as well as the paper prepared in control 1. The printed synthetic papers were examined by an electron microscope after printing. It was observed that due to the very fine and minute porous structure on the surface of the synthetic paper of Example 11, ink receptivity was excellent. With regard to the control, untreated film of 1, the ink receptivity was fixed only on the surface and excellent ink receptivity was not exhibited.

COMPARATIVE EXAMPLES 1-3

Comparative Example 1

A comparative synthetic paper was prepared in accordance with the description of Example 5 of French Pat. No. 1,508,903 (corresponding to Example 1 of Japanese patent publication No. 29,759/69).

Comparative Example 2

A composition of the following recipe:

| | Parts by weight |
|---|---|
| Low density polyethylene (same as used in Comparative Example 1) | 70 |
| Polystyrene (same as used in Comparative Example 1) | 30 |
| $TiO_2$ | 10 |
| Clay | 10 | was employed and a comparative synthetic paper was prepared in accordance with the description of Example 5 of French Pat. No. 1,508,903.

Comparative Example 3

A composition of the following recipe rich in polystyrene:

| | Parts by weight |
|---|---|
| Polystyrene (same as used in Comparative Example 1) | 100 |
| Ethylene-vinyl acetate copolymer | 10 |
| $TiO_2$ | 10 |
| Clay | 10 | was formed into a biaxially stretched film, and the film was dipped in a bath of ethyl acetate for 2 minutes and then in a bath of methanol for 2 minutes. In this way a comparative synthetic paper was prepared.

The surface of the papers prepared in Comparative Examples 1-3 were examined by an electron microscope. It was observed that with regard to the synthetic paper of Comparative Example 1, the elution of the surface layer was far advanced and the pores were very coarse. With regard to the paper of Comparative Example 2, it was observed that a great number of particles of titanium dioxide and clay remained on the surface and the surface was as coarse as that of the paper of Comparative Example 1. Pores were not substantially formed on the surface of the paper of Comparative Example 3.

EXAMPLE 13

In the same manner as in Example 11, a biaxially stretched film was prepared from a composition of the following recipe:

| | Parts by weight |
|---|---|
| High impact polystyrene | 100 |
| Ethylene-vinyl acetate copolymer | 10 |
| $TiO_2$ | 10 |
| Clay | 10 |

The resulting film was divided into 3 parts. Part 1 was dipped for 0.5 seconds in a mixed liquor consisting of 30% by volume of dimethyl formamide and 70% by volume of acetone and then in water for 5 seconds in accordance with the present invention. For comparison, part 3 was dipped for 0.5 second in a mixed liquor consisting of 30% by volume of ethyl acetate and 70% by volume of acetone and then in water for 5 seconds. Part 2 was not treated at all as a control.

On each of parts 1, 2 and 3 a date mark was stamped with an aqueous ink.

It was observed that on part 1 treated in accordance with the present invention, the letters were printed very clearly whereas on comparative part 3 and control part 2, the printing was poor.

The following test pieces were printed with the use of the same printing ink to obtain the following printing test sheets and the degree of transfer to the paper was examined.

Test Piece 1: Commercially available art paper.
Test Piece 2: The synthetic paper of Example 12.
Test Piece 3: Comparative synthetic paper obtained by biaxially stretching a film formed from a composition composed of 100 parts by weight of high impact polystyrene, 10 parts by weight of ethylene-vinyl acetate copolymer, 10 parts by weight of $TiO_2$ and 10 parts by weight of clay, dipping the film in a bath of ethyl acetate and then dipping it in a bath of water.
Test Piece 4: Untreated film obtained by biaxially stretching a film of the same composition as Test Piece 3.
Test Piece 5: Untreated biaxially stretched film composed only of high impact polystyrene.
Test Piece 6: Comparative synthetic paper of Comparative Example 1.

It was observed that the synthetic paper of the present invention, i.e., Test Piece 2, exhibited an ink setting property comparable to that of the commercially available art paper, Test Piece 1, and that for Test Pieces 3 through 6, the transfer of the ink was observed for a long period of time after printing thereby indicating the poor ink setting properties of the papers and films.

While the present invention has been described primarily with regard to the foregoing exemplification, the present invention is in no way to be deemed as limiting thereto but, rather, must be construed as broadly as any or all equivalents thereof.

What is claimed is:

1. A process for the preparation of synthetic paper having a finely porous surface from about 0.5 to about 20 microns thick, which comprises:
   (A) homogeneously melting and milling a composition consisting essentially of
      (1) 100 parts by weight of a styrene synthetic resin component selected from at least one member of the group consisting of styrene homopolymers, high impact polystyrenes, acrylonitrile-styrene copolymers, acrylonitrile-butadiene-styrene copolymers, methyl methacrylate-styrene copolymers, α-methyl-styrene homopolymers and α-methyl styrene copolymers,
      (2) 5 to 50 parts by weight of an ethylene synthetic resin component selected from at least one member of the group consisting of high, medium or low density polyethylenes, low polymerized polyethylenes, chlorinated polyethylenes, ethylene-propylene copolymers, ethylene-vinyl acetate copolymers, ethylene-vinyl chloride copolymers, ethylene-ethyl acrylate copolymers, and ethylene-acrylic acid ionomers, and
      (3) 1 to 200 parts by weight of an inorganic filler;
   (B) shaping the milled composition into a film;
   (C) contacting for a period of from about 0.1 to about 1.5 seconds at least one surface of the film with a first liquid system at a temperature of from 5 to 35° C., said first liquid system being capable of dissolving the styrene synthetic resin component and comprising
      (1) at least 10% by volume of at least one liquid selected from the group consisting of dialkylamides, and dialkylsulfoxides, and
      (2) up to 90% by volume of water-miscible conventional organic solvents or carriers; and
   (D) thereafter contacting the same surface with a second liquid system at a temperature of from 5 to 50° C., said second liquid system being miscible with said first liquid system but incapable of dissolving the styrene synthetic resin component, and comprising (1) at least 50% by volume of water, and
(2) not more than 50% by volume of water-miscible conventional organic solvents or carriers.

2. The process of claim 1 wherein the inorganic filler is selected from at least one member of the group consisting of calcium carbonate, magnesium carbonate, basic lead carbonate, silica, aluminum silicate, sodium silicate, calcium silicate, magnesium silicate, talc, mica powder, clay, diatomaceous earth, calcium sulfate, barium sulfate, zinc sulfide, magnesium sulfide, and titanium oxide.

3. The process of claim 1 wherein the synthetic paper has a porous surface layer with a thickness of 2 to 10 microns.

4. The process of claim 1, wherein the first liquid system has dissolved therein, up to 20% by weight of styrene synthetic resin.

5. The process of claim 1 wherein the first liquid system is a dispersion in which an inorganic filler is dispersed.

6. The process of claim 1 wherein, prior to contacting at least one surface of the film with the first and second liquid systems, the film is stretched by at least 1.5 times in at least one direction.

7. The process of claim 1 wherein the first liquid system comprises 10 to 80% by volume of said dialkylamide, dialkylsulfoxide or a mixture thereof, and is maintained at a temperature of from 10 to 25° C.

8. The process of claim 1 wherein the second liquid system comprises at least 60% by volume of water, and is maintained at a temperature of from 10 to 25° C.

9. The process of claim 1 wherein the ethylene synthetic resin component is a copolymer.

References Cited

UNITED STATES PATENTS

| | | | |
|---|---|---|---|
| 3,551,538 | 12/1970 | Yamamoto et al. | 264—53 |
| 3,132,194 | 5/1964 | Edmonds, Jr. et al. | 264—49 |
| 3,228,896 | 1/1966 | Canterino et al. | 264—49 |

FOREIGN PATENTS

| | | | |
|---|---|---|---|
| 1,508,903 | 11/1967 | France | 264—49 |

OTHER REFERENCES

Encyclopedia of Polymer Science and Technology, vol. 6, 1967, Wiley & Sons, N.Y., p. 420–429.

MELVYN I. MARQUIS, Primary Examiner

U.S. Cl. X.R.

161—164; 260—897 A; 264—49, 210 R, 288, 289, 290, 341, 342 R, 344

UNITED STATES PATENT OFFICE
CERTIFICATE OF CORRECTION

Patent No. 3,840,625     Dated October 8, 1974

Inventor(s) Sadao YAMAMOTO ET AL

It is certified that error appears in the above-identified patent and that said Letters Patent are hereby corrected as shown below:

In the Heading, insert patentees' Foreign Application Priority Data as follows:

-- Japanese Application No. 43/78706, filed October 28, 1968

Japanese Application No. 43/40060, filed June 10, 1968.

Signed and sealed this 17th day of December 1974.

(SEAL)
Attest:

McCOY M. GIBSON JR.
Attesting Officer

C. MARSHALL DANN
Commissioner of Patents